United States Patent [19]
Fujimoto

[11] Patent Number: 6,125,309
[45] Date of Patent: Sep. 26, 2000

[54] VEHICLE CONTROL DEVICE

[75] Inventor: Takanori Fujimoto, Tokyo, Japan

[73] Assignee: Mitsubishi Denki Kabushiki Kaisha, Tokyo, Japan

[21] Appl. No.: 08/978,188

[22] Filed: Nov. 25, 1997

[30] Foreign Application Priority Data

Jul. 24, 1997 [JP] Japan .................................. 9-198719

[51] Int. Cl.[7] .................................................. G06F 7/00
[52] U.S. Cl. .............................. 701/1; 701/115; 701/53; 701/35; 701/31; 701/34; 701/33; 701/102; 477/108; 395/712
[58] Field of Search .................................. 701/1, 115, 53, 701/35, 31, 34, 33, 102; 477/108; 395/712

[56] References Cited

U.S. PATENT DOCUMENTS

| 5,506,773 | 4/1996 | Takaba et al. | 701/29 |
| 5,712,512 | 1/1998 | Ostermann et al. | 307/10.2 |
| 5,771,474 | 6/1998 | Matt et al. | 701/29 |
| 5,775,783 | 7/1998 | Byon | 303/122.08 |
| 5,786,998 | 7/1998 | Neeson et al. | 701/35 |
| 5,964,813 | 10/1999 | Ishii et al. | 701/35 |

FOREIGN PATENT DOCUMENTS 2-99746  4/1990  Japan .

*Primary Examiner*—William A. Cuchlinski, Jr.
*Assistant Examiner*—Olga Hernandez
*Attorney, Agent, or Firm*—Sughrue, Mion, Zinn, Macpeak & Seas, PLLC

[57] ABSTRACT

The contents of a ROM are highly reliably changed while the ROM is attached to a substrate. A vehicle control device has an electrically programmable nonvolatile memory storing a vehicle control program. A ROM update process includes a collation in which a check is made to determine whether the updating of the ROM was correctly executed. An abnormal process ensures an output from the control device clearly is an abnormal control amount under even ordinary vehicle drive conditions.

19 Claims, 5 Drawing Sheets

VEHICLE CONTROL DEVICE

BACKGROUND OF THE INVENTION

1. Field of the Invention

The present invention relates to a vehicle control device for engine control, transmission control, or the like for arithmetically processing a control amount according to a control program by using a microcomputer and, more particularly, to a vehicle control device in which a memory for storing a control program can be updated while being incorporated in the control device.

2. Description of the Related Art

Since a vehicle control device is generally under severe conditions such as temperature or vibration, a socket for attaching a ROM (Read-Only Memory) or the like for storing a control program cannot be used to improve vibration resistance in, especially engine control. For this reason, a program is written in the memory by an only-purpose machine before the control device is assembled, and the memory is directly soldered on a substrate.

For example, in an engine control device of vehicle control devices, the contents in a ROM may be necessarily changed due to unmatching between control data of respective engines in mass production or the like.

In this case, in a conventional technique, the ROM is once removed and updated, and then must be soldered. As a result, there are problems such as an increase in number of steps and degradation of reliability of the soldered portion.

In order to solve the above problems, in a conventional engine control device described in Japanese Patent Publication No. 8-2556562, in a change of the contents of a ROM, a new program is written in the ROM while the ROM is attached to a substrate.

However, such a conventional device has no measure about writing defect occurring in such a case that a signal is stopped due to some factor, e.g., an instantaneous cut-off operation of a line (communication signal line) in the middle of an updating operation. In steps following the writing operation, the ROM on which data is written by some method must be checked. For this reason, operation steps increase in number, and productivity is degraded. In addition, a check result may be overlooked by an artificial mistake in the check step.

In this case, when the above writing defect may appear as a control amount which is apparently abnormal under almost all operation conditions, overlooking in the check step may be detected in the following steps. However, when the writing defect may appears as a control amount which is abnormal under only a special condition, overlooking cannot be detected, and the defective products disadvantageously issue to the market.

SUMMARY OF THE INVENTION

The present invention has been made to solve the above problems, and has as its object to provide a vehicle control device which can highly reliably change the contents of a ROM while the ROM is attached to a substrate.

According to one aspect of the present invention, there is provided a vehicle control device comprising storage means in which a vehicle control program is stored; and updating process means which updates the control program stored in the storage means and performs an abnormal process when the updated control program is abnormal, wherein an arithmetic process is performed on the basis of a vehicle drive state according to the normally updated control program to output a control amount. According to this arrangement, when control data must be changed for some reason, the control program can be updated without removing the storage means, steps performed in the change of the storage means can be reduced in number, and the control program can be updated even while the vehicle control device is installed in a vehicle. For this reason, an advantage that a measurement against a disorder can be rapidly performed in the market can be obtained.

In addition, when writing defect occurs for some reason in an updating operation, the writing defect can be easily detected in the step following the updating step, and defective products can be prevented from being issued to the market. Especially in a measure against a disorder in the market, the control device is effective when the control program is updated while the control device is installed in a vehicle. Therefore, an advantage that the control program can be highly reliably updated can be obtained.

In one form of the invention, the updating process means comprises collation means for checking whether a updating process is correctly executed, and abnormal process means for processing an output from the control device appearing as an apparently abnormal control amount under an ordinary vehicle drive condition for a vehicle. According to this arrangement, when the control data must be changed for some reason, the control program can be updated without removing the storage means. Therefore, steps performed in the change of the storage means can be reduced in number, and the control program can be updated even while the vehicle control device is installed in a vehicle. For this reason, an advantage that a measurement against a disorder can be rapidly performed in the market can be obtained.

In addition, the updating process means comprises abnormal process means for processing an output from the control device appearing as an apparently abnormal control amount under an ordinary vehicle drive condition for a vehicle when writing defect occurs for some reason in an updating operation. For this reason, the writing defect can be easily detected in the step following the updating step, and defective products can be prevented from being issued to the market. Especially in a measure against a disorder in the market, the control device is effective when the control program is updated while the control device is installed in a vehicle. Therefore, an advantage that the control program can be highly reliably updated can be obtained.

In another form of the invention, the collation means is a checksum of program codes to be updated. According to this arrangement, an advantage that reliability of an updating operation can be improved can be obtained.

In a further form of the invention, a vehicle control device according to claim 2, the abnormal process means has a process of rewriting a program for arithmetically processing an abnormal control amount. According to this arrangement, an advantage that even if various abnormal conditions such as fuel cut ect., occur, the abnormal process means is easily able to correspond it can be obtained.

In a still further form of the invention, the updating process means updates the control program stored in the storage means into an updating program stored in an external device on the basis of an external command. According to this arrangement, an advantage that the control program can be more efficiently updated while the control device is installed in a vehicle can be obtained.

In a yet further form of the invention, the storage means is an electrically programmable nonvolatile memory. According to this arrangement, an advantage that the control program can be efficiently updated can be obtained.

DESCRIPTION OF THE PREFERRED EMBODIMENTS

As an embodiment of a vehicle control device according to the present invention, for example, a case wherein the present invention is applied to an engine control device will be described below with reference to the accompanying drawings.

Embodiment 1

Figure 1:
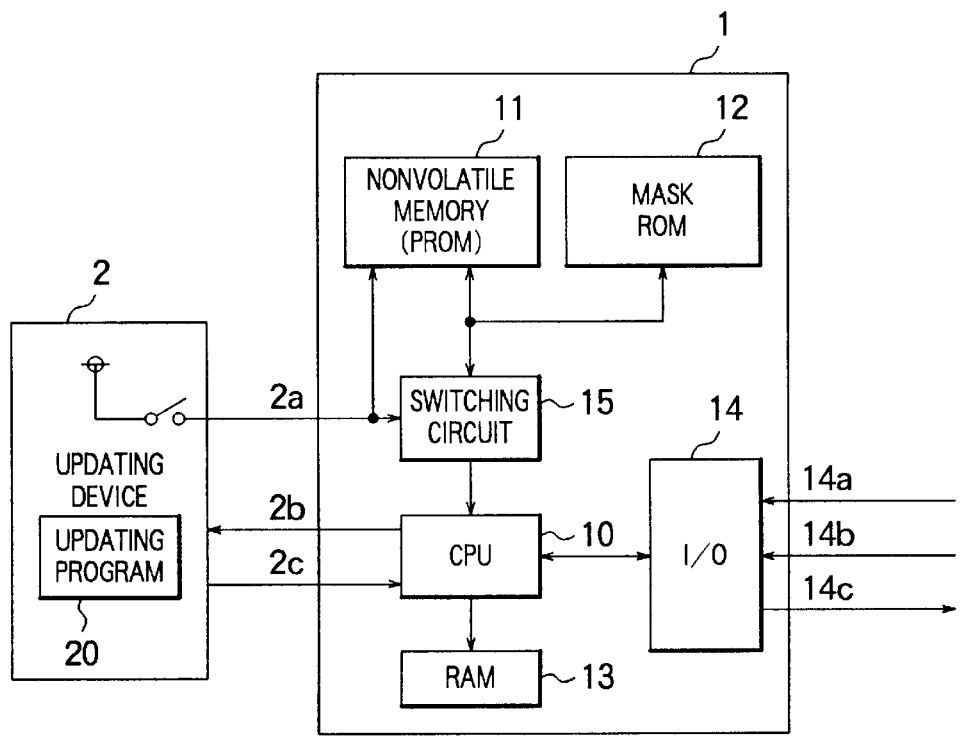
FIG. 1 is a view showing the arrangement showing an embodiment of the present invention.

FIG. 1 is a view showing the arrangement of an embodiment according to the present invention.

Referring to FIG. 1, an engine control device 1 comprises a CPU 10 for various arithmetic operations and processes, a PROM (nonvolatile) 11 serving as an electrically erasable/writable storage means in which a control program or data is loaded on the CPU 10 to perform the arithmetic operations and processes, a mask ROM 12, which is disabled from being erased/written, in which an updating process program for updating the PROM 11 is stored, a RAM 13 for writing or reading data which is arithmetically operated and processed by the CPU 10, an I/O 14 for receiving input signals from various sensors or outputting various control signals, and a switching circuit 15 for selecting the updating process program stored in the mask ROM 12 and the control program stored in the PROM 11 on the basis of an updating signal 2a from an updating device 2 (to be described later) serving as an external device.

The updating device 2 incorporates an updating program 20 and a program for controlling this device. The mask ROM 12 of the engine control device 1 receives the updating program 20 incorporated in the updating device 2 through the switching circuit 15, the CPU 10, and a serial communication line 2c to store an updating process program for updating the PROM 11.

A serial communication line 2b is used when the CPU 10 checks the updating device 2 to determine whether the receiving operation is correctly performed, when a control signal is transmitted to the updating device 2, or the like.

A crank angle signal 14a for measuring an engine speed and an intake air amount signal 14b for measuring an amount of air taken in an engine are input to the I/O 14, a fuel injection amount to the engine is arithmetically operated by the CPU 10 on the basis of these input signals, and a control amount depending on the arithmetic result is output as a fuel injection control signal 14c through the I/O 14.

The CPU 10, the PROM 11, the mask ROM 12, the RAM 13, the I/O 14, and the switching circuit 15 are connected to each other through address/data buses.

A control program required for engine control is stored in the PROM 11, and the PROM 11 can perform an electrically erasing/writing operation. However, when the updating signal 2a is not input from the external updating device 2, the PROM 11 serves as a read-only ROM which cannot perform an erasing/writing operation. When the updating signal 2a is input, the PROM 11 serves as a ROM which can perform an erasing/writing operation.

The CPU 10, the mask ROM 12, the switching circuit 15, and the updating device 2 constitutes an updating process means.

Figure 2:
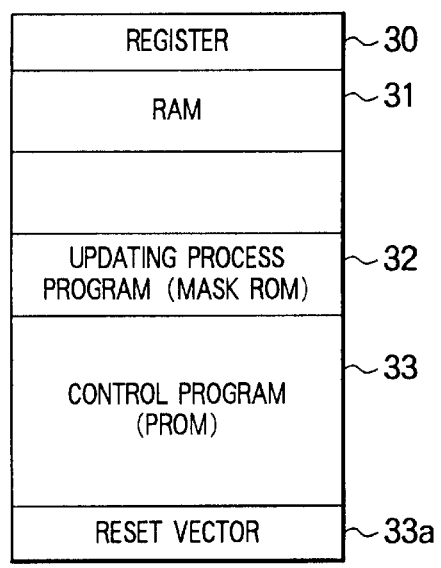
FIG. 2 is a view showing address allocation for a memory in an embodiment of the present invention.

FIG. 2 is a memory map showing address allocation for a memory included in the engine control device 1 in this embodiment. In FIG. 2, memory areas are arranged in ascending order of addresses from the top.

More specifically, a memory area 30 for various registers for switching the functions in the CPU 10, a memory area 31 for the RAM 13, a memory area 32 for the mask ROM 12 for storing an updating process program, a memory area 33 for the PROM 11 for storing a control program required for engine control, and a reset vector area 33a which is a part of the memory area 33 are sequentially arranged from the top. Upon completion of reset releasing, the CPU 10 loads an address designated by the reset vector area 33a, and the control program is executed and processed from the designated address.

The operations will be described below.

An updating process for the PROM 11 will be described below with reference to FIGS. 3 to 6.

Figure 3:
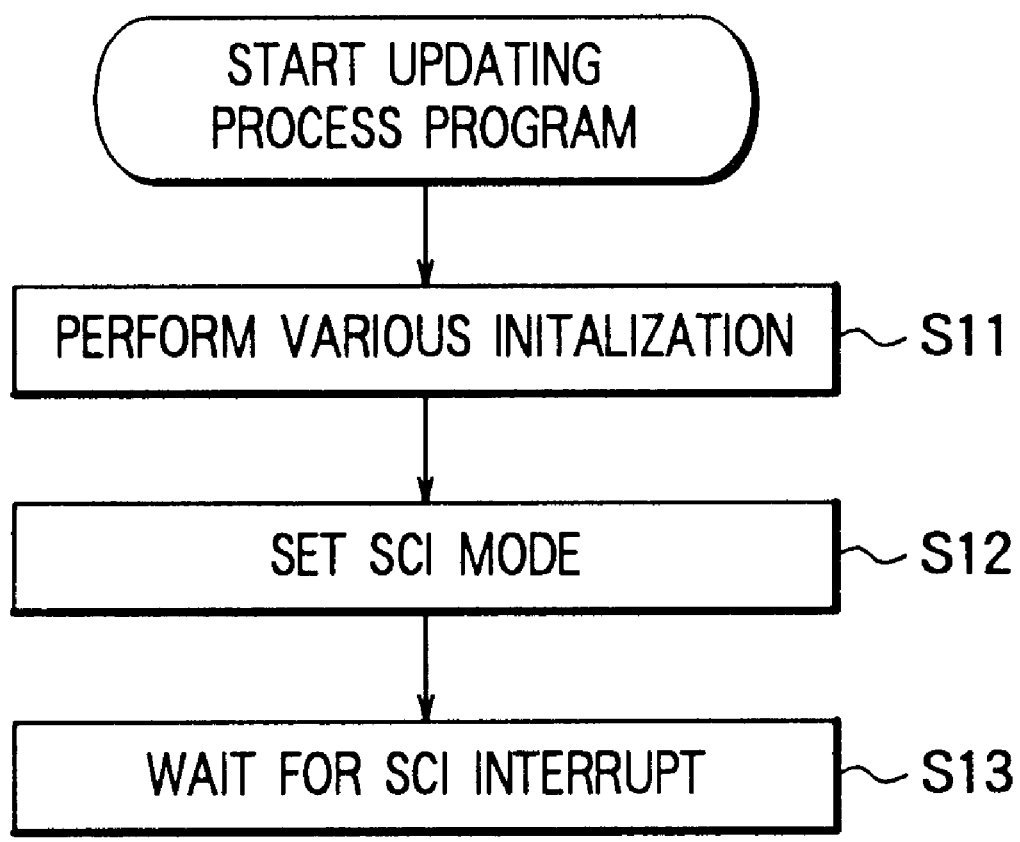
FIG. 3 is a flow chart showing an updating process in an embodiment of the present invention.

FIG. 3 is a flow chart showing the processes of the updating process program stored in the mask ROM 12 and executed when the updating signal 2a is input from the updating device 2 to the engine control device 1.

Referring to FIG. 3, various initial settings for the processes are performed in step S11, and a serial communication (SCI) mode for receiving an updating command from the updating device 2 and the updating program 20 incorporated in this device, sending a reply to the command, or the like is performed in step S12. In step S13, an external communication signal is received, a reception interrupt wait state for performing an interrupt process is set.

Figure 4:
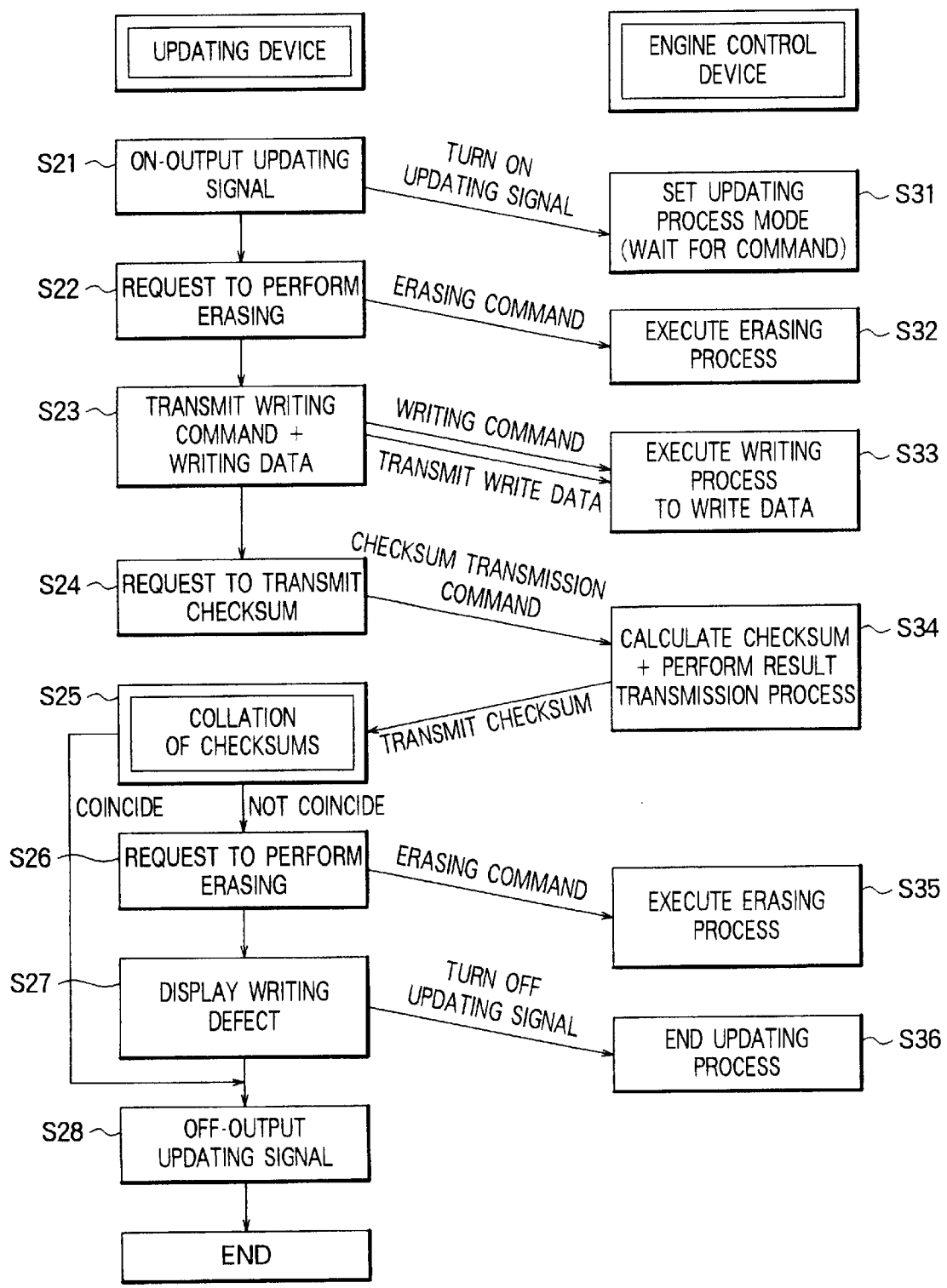
FIG. 4 is a chart showing a communication sequence for updating in an embodiment of the present invention.
Figure 5:
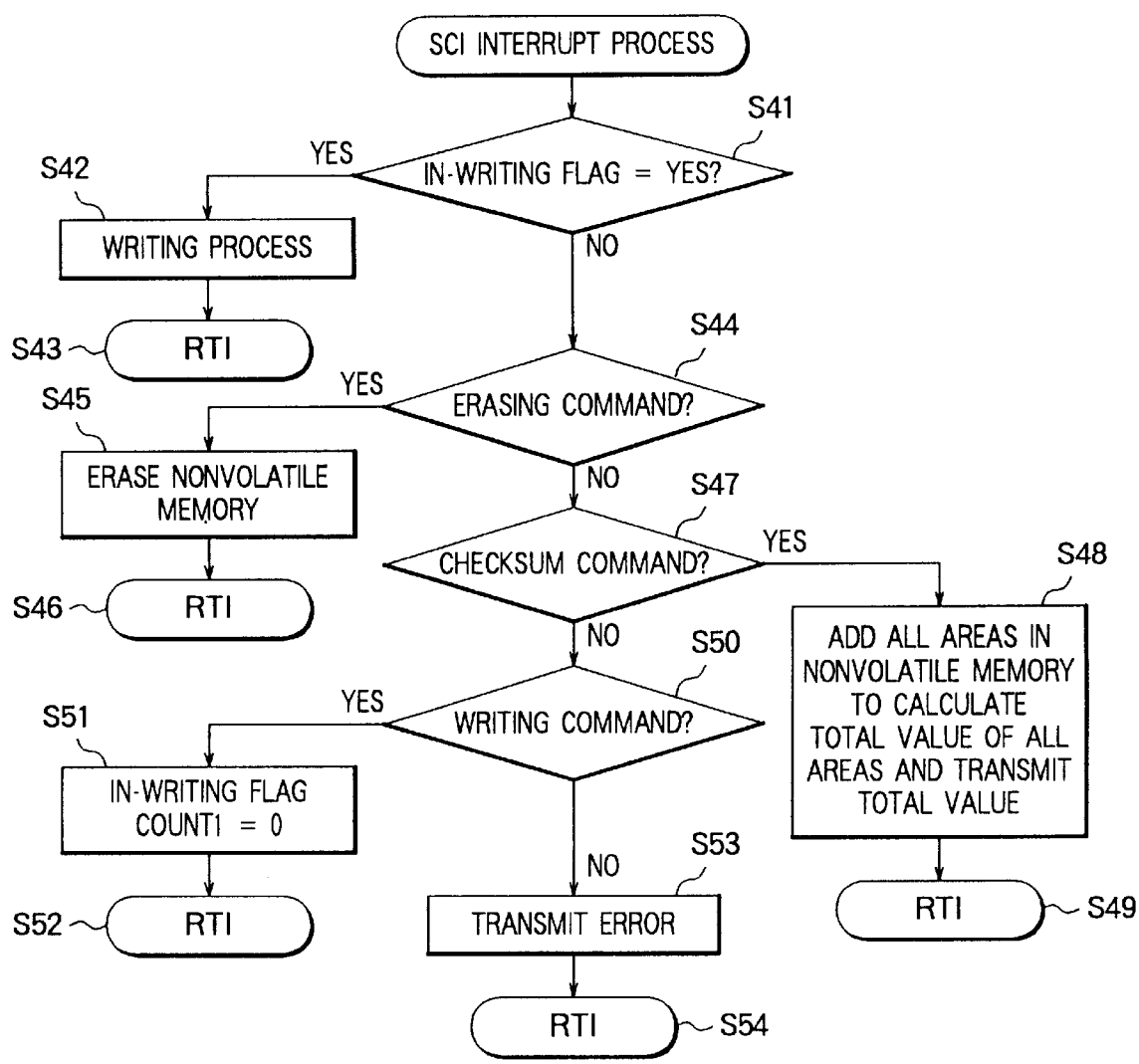
FIG. 5 is a flow chart showing an updating process using serial communication in an embodiment of the present invention.

FIG. 4 is a chart showing a communication sequence between the engine control device 1 and the updating device 2 which are used for an updating process. FIG. 5 is a flow chart showing processes executed by SCI interrupt occurring when a communication signal such as a command from the updating device 2 is received.

Referring to FIG. 4, when the updating signal 2a from the updating device 2 is ON-output in step S21, the engine control device 1 sets an updating process mode in step S31. More specifically, when the updating signal 2a is ON-output, the PROM 11 is enabled to perform an erasing/writing operation, a switching operation to the updating process program stored in the mask ROM 12 is performed by the switching circuit 15, and the CPU 10 executes the processes of the flow chart shown in FIG. 3, and then is set in an SCI interrupt wait state, i.e., a command wait state.

When the updating device 2 transmits an erasing command for erasure in step 22, the engine control device 1 executes an erasing process in step S32. More specifically, when the CPU 10 receives an erase command, the SCI interrupt process shown in FIG. 5 is executed. If "in-writing flag" is not YES in step S41, an erase command is recognized in step S44, contents of the PROM (nonvolatile memory) 11 is erased in step S45, and the recent interrupt process is completed in step S46.

When the updating device 2 transmits a write command for a writing operation in step S23 in FIG. 4, the engine control device 1 prepares the writing process in step S33, and writes a control program transmitted in a predetermined format in the PROM 11.

More specifically, when the CPU 10 receives the write command, the SCI interrupt process (FIG. 5) is executed, the CPU 10 recognizes the write command in step S50, and the CPU 10 sets the "in-writing flag" to YES. At this time, "count 1" of a counter (not shown) included in the CPU 10 for measuring the write data number in the writing process is set to 0, and the recent interrupt is temporarily ended in step S52.

When write data transmitted after the write command, the SCI interrupt process (FIG. 5) is executed again, and the "in-writing flag" is checked in step S41 serving as the first step. However, since "in-writing flag" is set to YES during the previous SCI interrupt process, "in-writing flag=YES" is determined in step S41, and a writing process (step S42) is executed.

Figure 6:
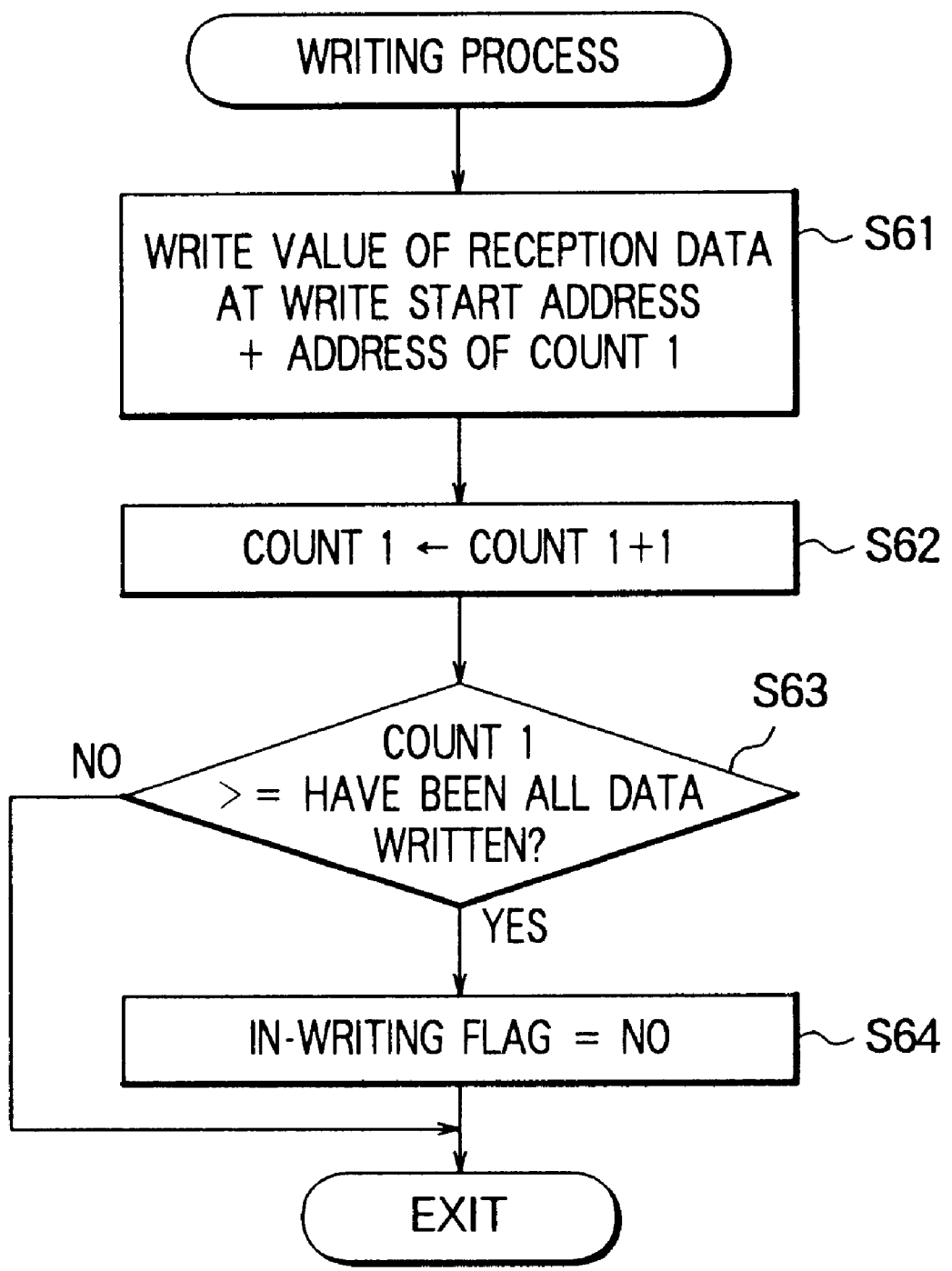
FIG. 6 is a flow chart showing a writing process in an embodiment of the present invention.

The detailed process of the writing process in step S42 will be described below with reference to FIG. 6 showing the flow chart of the writing process.

As write data, "write all data number (n)"+"write start address"+"write data D1"+ . . . +"write data Dn" are transmitted in this order.

Referring to FIG. 6, at an address of the PROM 11 obtained by adding the value of count 1 set to zero in step S51 to the "write start address" transmitted secondly in step S61, "write data D1" which is transmitted thirdly is written.

The value of count 1 is incremented in step S62, the value of count 1 is compared with "write all data number n" transmitted first in step S63. Until the value of count 1 reaches "write data number n", i.e., until all the data are completely written, the above process is repeated every time the write data is received.

In this manner, "write data" transmitted thirdly, fourthly, . . . , are sequentially written in the PROM 11.

If it is determined in step S63 that all the data are completely written, the "in-writing flag" is set to NO in step S64 to end the writing process. The "in-writing flag" is set to NO for the following reason. That is, next reception data is determined to be NO in step S41 of the SCI interrupt process (FIG. 5) executed when the data is received, and the next reception data is recognized as a next command.

Returning to FIG. 4, when the updating device 2 transmits a checksum transmission command to request a checksum in step S24, the engine control device 1 calculates the checksum and transmits the result in step S34.

More specifically, when the CPU 10 receives a checksum transmission command, the SCI interrupt process (FIG. 5) is executed, the CPU 10 recognizes a checksum command in step S47, and data in all the areas of PROM 11 is added in step S48. After the total value (checksum) is calculated, the result is transmitted to the updating device 2, and the recent interrupt process is ended in step S49.

Steps S25, S26, and S27 shown in FIG. 4 and processed by the updating device 2 are the characteristic features of this embodiment. First, the checksum which has been transmitted is calculated in advance in step S25 (collation means), and the value of the checksum collates with the design value of the stored checksum.

When the collation results coincide with each other, the updating signal 2a is turned off in step S28 to end all the updating processes, and the engine control device 1 receives the OFF updating signal 2a to end all the updating processes.

However, when collation results do not coincide with each other in step S25, the updating device 2 again transmits an erasing command for erasure in step 26, and after the updating device 2 displays writing defect in step S27, the process in step S28 described above is performed to end all the updating processes.

On the other hand, when the engine control device 1 recognizes the erasing command, it again erases all contents of the PROM 11 in step S35 (abnormal process means) with the same method as the above described. When all contents of the PROM 11 is thus erased by the engine control device 1, the engine control can be not performed, outputs are obtained which are apparently different from a normal operation condition (in this case, outputs are undefined.), so that the writing defect can be easily detected in the step following the updating step.

Referring to FIG. 5, when the signal transmitted from the updating device 2 does not correspond to any one of signals in steps S41, S44, S47, and S50, an error sent back to the updating device 2 in step S53, the interrupt process is ended in step S54.

In reception of the error reply, although not shown, for example, the updating device 2 can also perform the same process as that performed when the checksums do not coincide with each other in step S25.

In this embodiment, an updating process means for updating a control program stored in an electrically programmable nonvolatile memory into an updating program stored in an external updating device is arranged, the updating process means comprises collation means for checking whether an updating process is correctly executed, and abnormal process means for processing an output from the control device appearing as an apparently abnormal control amount under an ordinary vehicle drive condition for a vehicle.

For this reason, the control program can be updated without removing the nonvolatile memory, i.e., a ROM. In addition, when writing defect occurs due to some factor, the writing defect can be easily detected in the step following the updating step, and defective products can be prevented from being issued to the market.

Embodiment 2

Embodiment 1 has described a case wherein when a updating process is not correctly executed, an erasing process again is executed for processing an output from the control device appearing as an apparently abnormal control amount. However, a control program which appears as an apparently abnormal control amount such as a fuel cut again may be writed.

In Embodiment 1, fuel injection control which is typical one of engine controls has been described. However, an input/output signal may also perform ignition control and idling speed control for controlling an amount of air for idling.

Furthermore, in Embodiment 1, a case wherein the present invention is applied to an engine control device has been described. However, the present invention is not limited to this arrangement, and the present invention can also be similarly applied to other vehicle control devices such as a transmission control device and a power steering control device.

What is claimed is:

1. A vehicle control device comprising;
    a CPU for performing arithmetic operations;
    a first memory storing a vehicle control program of program codes; and
    a second memory storing an updating process program;
    wherein, when said updating process program is active on said CPU, said vehicle control device is responsive to an external signal to calculate a checksum of said program codes of said vehicle control program.

2. A vehicle control system, comprising:
    storage means in which a vehicle control program is stored, and
    updating process means for performing an updating process which updates the control program stored in said storage means and performs an abnormal process when the updatten control program is abnormal;
    wherein:
        an arithmetic process is performed on the basis of a vehicle drive state according to the normally updated control program to output a control amount;

said updating process means comprises collation means for checking whether said updating process is correctly executed;

said updating process means comprises abnormal process means for processing an output from said vehicle control device to appear as an abnormal control amount under an ordinary vehicle drive condition; and said abnormal process means has a process of rewriting a program for arithmetically processing an abnormal control amount.

3. A method for detecting errors in updating an original vehicle control program stored in a memory, comprising the steps of:

writing program codes of an intended updated vehicle control program to said memory as an actual updated vehicle control program;

comparing a first checksum of said program codes of said intended updated vehicle control program with a second checksum of program codes of said actual updated vehicle control program;

when said first checksum matches said second checksum, judging that no errors occurred during said writing;

when said first checksum does not match said second checkum, judging that errors occurred during said writing.

4. The method for detecting errors in updating an original vehicle control program as set forth in claim 3, wherein, when said first checksum does not match said second checkum, said actual updated vehicle control program is erased.

5. The method for detecting errors in updating an original vehicle control program as set forth in claim 3, wherein, when said first checksum does not match said second checkum, said actual updated vehicle control program is rewritten to output abnormal values under normal vehicle operating conditions.

6. A vehicle control device, comprising:

storage means for storing a vehicle control program;

updating process means for carrying out an update process for updating the vehicle control program into an intended updated vehicle control program, an actual updated vehicle control program resulting from said update process;

when the actual updated vehicle control program is abnormal, said updating process means performing an abnormal process after said update process; and when said actual updated vehicle control program is normal, said vehicle control device operating according to said actual updated vehicle control program so as to perform an arithmetic process based on one or more vehicle drive state inputs to output a control amount.

7. The vehicle control device according to claim 6, wherein said updating process means updates the vehicle control program in response to an external command by receiving said intended updated vehicle control program from an external device.

8. The vehicle control device according to claim 6, wherein said storage means is an electrically programmable nonvolatile memory.

9. The vehicle control device according to claim 6, wherein said updating process means comprises:

collation means for checking whether said updating process is correctly executed, and abnormal process means for performing said abnormal process so as to produce an abnormal output from said vehicle control device under an ordinary vehicle drive state.

10. The vehicle control device according to claim 9, wherein said collation means checks said execution of said updating process by comparing a checksum of program codes of said actual updated vehicle control program with a checksum of program codes of said intended updated vehicle control program.

11. The vehicle control device according to claim 9, wherein said abnormal process means rewrites said arithmetic process of said actual updated vehicle control program so that said arithmetic process produces an abnormal control amount as said abnormal output.

12. The vehicle control device according to claim 9, wherein said updating process means updates the vehicle control program in response to an external command by receiving said intended updated vehicle control program from an external device.

13. A vehicle control system update method, comprising:

storing a vehicle control program;

carrying out an update process for updating the vehicle control program into an intended updated vehicle control program, an actual updated vehicle control program resulting from said update process;

when the actual updated vehicle control program is abnormal, performing an abnormal process after said update process; and when said actual updated vehicle control program is normal, operating according to said actual updated vehicle control program so as to perform an arithmetic process based on one or more vehicle drive state inputs, and outputting a control amount.

14. The vehicle control system update method according to claim 7, wherein said updating process updates the vehicle control program, in response to an external command, by receiving said intended updated vehicle control program from an external device.

15. The vehicle control system update method according to claim 7, wherein said storing of vehicle control program is performed using an electrically programmable nonvolatile memory.

16. The vehicle control system update method according to claim 13, wherein said updating process comprises:

checking whether said updating process is correctly executed, and performing said abnormal process so as to produce an abnormal output under an ordinary vehicle drive state.

17. The vehicle control system update method according to claim 16, wherein said checking comprises comparing a checksum of program codes of said actual updated vehicle control program with a checksum of program codes of said intended updated vehicle control program.

18. The vehicle control system update method according to claim 16, wherein said updating process means updates the vehicle control program, in response to an external command, by receiving said intended updated vehicle control program from an external device.

19. The vehicle control system update method according to claim 16, wherein said performing of said abnormal process includes rewriting said arithmetic process of said actual updated vehicle control program so that said arithmetic process produces an abnormal control amount as said abnormal output.

* * * * *